United States Patent Office 3,275,442
Patented Sept. 27, 1966

3,275,442
METHOD OF IRREVERSIBLY DARKENING A BIS (p-AMINOPHENYL) VINYL CARBONIUM POLY-METHINE LEUCO DYE
Hans Kosenkranius, Cincinnati, Ohio, assignor to Polacoat Incorporated, Blue Ash, Ohio
No Drawing. Filed Nov. 14, 1961, Ser. No. 152,150
3 Claims. (Cl. 96—90)

This invention relates to a photosensitive composition, and to methods of making the same. In particular, this invention relates to a photosensitive composition which darkens irreversibly on exposure to actinic radiation, and to methods of making the same.

The compositions of the present invention comprise a phototropic dye, a solvent or solvent system therefor, and a halogenated substance. The compositions are materials which are pellucid (i.e. transparent or translucent) in the absence of light of wavelengths less than about 500 millimicrons. On exposure to light of wavelengths shorter than about 500 millimicrons, in particular ultra-violet light of a wavelength less than about 400 millimicrons, the pellucid materials of the invention are irreversibly converted with a high quantum efficiency to compositions of increased optical density, including compositions which are substantially opaque to visible light.

The compositions in their pellucid form, that is before exposure to ultra-violet light or visible light of short wavelength, contain dyestuffs which normally show reversible phototropic reactions. In particular, the dyes are salt isomerization phototropic dyes, such as the triphenylmethane dyes and polymethine dyes, in their unactivated leuco form. The salt isomerization type phototropic dyes have at least two nitrogen atoms separated by an even number of conjugated single and double bonds. In their ionic form, the dyestuff molecules are capable of resonating according to the following scheme:

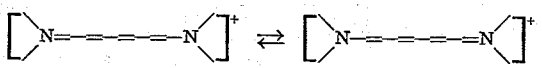

In the formulas, the alternating single and double lines indicate a series, indefinite but even in number, of conjugated bonds, usually carbon-carbon or carbon-nitrogen bonds, which may be in an aliphatic chain and/or in one or more rings, alicyclic or aromatic, including multiple and fused ring systems.

Typical triphenyl methane dyes of this type are the well-known methyl violet, ethyl violet, crystal violet, malachite green, the wool violets, aniline blue, light green S8, and many others well known to the art. The structure of a typical triphenylmethane dye is exemplified by the structure of malachite green shown below:

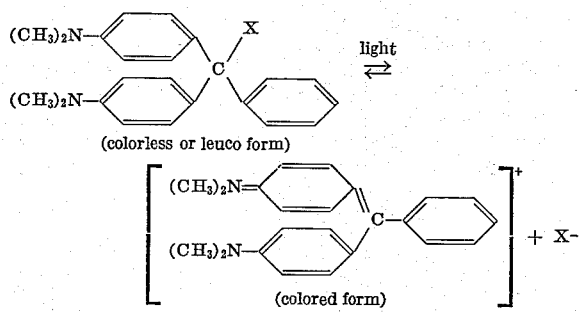

where X is an anion, for example the anion of a weak acid such as hydrogen cyanide.

Typical polymethine dyes are those disclosed in U.S. Patent 2,813,802, granted to Ingle et al. on November 19, 1957. As disclosed in said patent, the polymethine dyes are bis (p-aminophenyl) vinylcarbonium compounds whose colored ions have the characteristic structure:

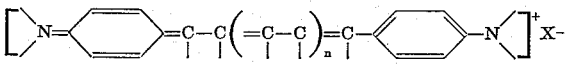

(or equivalent resonance forms) wherein $n$ is equal to 0, 1, 2, or 3, and X is a strong acid anion. As disclosed in said patent, preferred substituents for attachment to the nitrogen atom of the polymethine dyes are hydrocarbon groups, especially lower alkyl groups such as methyl, ethyl, isopropyl, n-propyl, n-butyl, 2-ethylhexyl, etc., but other substituents such as hydrogen atoms or higher alkyl groups such as cetyl or stearyl groups, other hydrocarbon groups such as alkenyl, aryl, aralkyl, or alicylic radicals, or hydrocarbon radicals substituted with groups such as hydroxy, alkoxy, sulfonic acid, halo, amino, nitro groups, etc., are also suitable. Preferred substituents for attachment to the terminal methine carbon atoms are aryl groups, especially aryl groups substituted with halo, especially chloro, amino, hydroxy, alkoxy, N-alkyl and N,N-dialkyl amino groups, etc., but other substituents such as those mentioned with respect to the nitro atom substituents of the foregoing paragraph are also suitable. Preferred substituents for attachment to the other, non-terminal, methine carbon atoms are hydrogen atoms or lower alkyl groups such as are mentioned above, but other substituents, including those mentioned earlier above as substituents, are acceptable.

Numerous examples of dyes of this type are given in Patent 2,813,802. Because of the complexity of the structure and naming of these compounds, repetition of all this subject matter will be avoided here, but attention is called to Column 4, lines 1–15 and to the examples of the patent. It is to be understood that the teachings of Patent 2,813,802 with respect to polymethine dyes are incorporated herein by reference.

Typical dyestuffs which can be used in the compositions of the present invention are the polymethine dyestuffs such as:

1,1,3-tris-4-(N,N-dimethylamino)phenyl vinylcarbonium salts;

1,3-bis-4-(N,N-dimethylamino) phenyl-1,3-bis-(phenyl) vinyl-carbonium salts;

1,5 - bis - 4 - (N,N - dimethylamino)phenyl - 1,5 - bis-(phenyl) divinyl-carbonium salts;

1,7 - bis - 4 - (N,N - dimethylamino)phenyl - 1,7 - bis-(phenyl) trivinylcarbonium salts;

1,1,3,3 - tetrakis - 4 - (N,N - dimethylamino)phenyl vinyl-carbonium salts;

1,1,5,5 - tetrakis - 4 - (N,N - dimethylamino)phenyl divinyl-carbonium salts; and 1,1,7,7-tetrakis-4-(N,N-dimethylamino)phenyl trivinylcarbonium salts;

and typical triphenylmethane dyes, such as malachite green, ethyl violet, brilliant green, and crystal violet.

These lists are merely exemplary, and not exclusive. The invention is generally applicable to triphenyl methane and, preferably, polymethine dyes.

In the compositions of the present invention, these salt isomerization phototropic dyes are present in the pellucid or unexposed material in their colorless (leuco) form. As known in the art, dyes of this type are bleached to their leuco form by the presence of an alkaline material, by which is meant one establishing a pH greater than 7. The alkaline bleaching agents causing conversion to the leuco form may be strong bases such as the alkali metal and alkaline earth metal hydroxides, e.g. potassium, sodium, lithium, calcium hydroxide, etc., as well as ammonium hydroxide. The alkaline materials may also be salts of weak inorganic acids such as soluble cyanides, borates, acetates, phosphates, carbonates, and the like.

Typical soluble salts of these anions would be the sodium and potassium salts, but other soluble salts are equally suitable, since the cation is not critical. In addition, the salts of weak organic acids, both aliphatic and aromatic, saturated or unsaturated, may be employed. Thus, soluble citrates, barbiturates, oleates, nucates, stearates, terephthalates, butyrates, salicylates, etc. can be employed.

In the compositions of the invention, the leuco dyes are incorporated into a solvent or combination of solvents for the dye. Since, on exposure to actinic radiation, the leuco form of the dye disappears and the colored form of the dye is generated, it is desirable to employ a solvent in which both the leuco form and the colored form of the dye are soluble. Otherwise, conversion of the leuco form to the colored form on activation of the composition by actinic radiation may precipitate the colored form, and the desired opacity of the exposed composition may be impaired.

Suitable solvents of this type are, for example, polar hydroxylic materials having a dielectric constant greater than about 4.5, but less than that of water, i.e. less than about 80. Particularly suitable materials are aliphatic compounds containing one or more hydroxy groups. Typical materials of this type are the monohydric alkanols having 1–6 carbon atoms and polyhydroxylic materials such as ethylene glycol, diethylene glycol, triethylene glycol, propylene glycol, dipropylene glycol, hexylene glycol, 1,2,6-hexanediol, 2-ethyl-2-butyl-1,3-propanediol, and 2,2-diethyl-1,3-propanediol. These monohydric and polyhydric alcohols may have one or more alkoxy substituents thereon. Thus, the following are typical aliphatic carbon-hydrogen-oxygen or alkylene glycol or polyol ether solvents which can be employed according to the present invention: 2-methoxyethanol, 2-ethoxyethanol, 2-butoxyethanol, 2-hexoxyethanol, 3-methoxy-1-butanol, 1-methoxy-2-propanol, 2-(2-methoxyethoxy) ethanol, 2-ethoxy-1-hexanol, 2,2-ethoxyethanol, methoxytriglycol, ethoxytriglycol, "Carbitol," butyl "Carbitol," hexyl "Carbitol," and 1-butoxyethoxy-2-propanol. In addition, solvents containing carbonyl oxygen, such as diacetone alcohol, may be employed.

These hydroxylic solvents can be employed alone, or may be combined with other solvents, particularly nitriles, to increase the solubility of the dyes therein. Again, the nitriles may be nitriles of numerous aliphatic and aromatic acids, and include acetonitrile, propionitrile, 3-methoxypropionitrile, 3-ethoxy-propionitrile, 4-methyl-valeronitrile, phenyl-acetonitrile, heptanenitrile, 1-napthonitrile, 3,4-dimethoxy-phenyl-acetonitrile, butyronitrile, p-toluonitrile, iminodiacetonitrile, etc.

In compositions in which one or more hydroxylic materials are combined with one or more nitriles, it is impossible to set a general rule on the proportions to be employed. The many dyes which can be used in the compositions of the present invention differ in their solubility and color intensity. To formulate a composition which will become substantially opaque on exposure to ultraviolet light, many factors including the nature and concentration of the particular dyestuff used, the degree of opacity desired, the thickness of the composition layer exposed, etc., come into play and influence the degree of solubility which may be desired to be obtained for the dye in the solvent or solvents employed. However, by working with a particular dye and with a particular end use in mind, and by fixing the variables extraneous to solubility, the average chemist will be able to determine by simple experiment the proportions of hydroxylic material or materials and nitrile or nitriles optionally combined therewith best suited for a particular use.

The third component of the composition of the present invention is a halogen-containing material, either organic or inorganic, capable of forming halogen free radicals on exposure to actinic radiation of a wavelength less than about 500 millimicrons. In particular, bromine and/or chlorine-containing materials are most suitable. Iodine compounds, for the most part, will form halogen free radicals on exposure to light, but are often so sensitive that free radicals will also be formed in the absence of radiation of short wavelengths. Chlorine-carbon and bromine-carbon bonds are, on the other hand, sufficiently stable so that substantial quantities of halogen free radicals are not formed except under stimulating radiation of short wavelength.

The chlorine- and bromine-containing compounds for use in the invention are either liquids or solids compatible with the solvent in the composition. Thus, elemental bromine may be incorporated into the composition, as well as organic materials such as bromoform, chloroform, carbon tetrachloride, 1,2-dichloroethylene, propylene dibromide, bromo-dichloromethane, methylene dibromide, hexachloroethane, and the like. Although the aforementioned organic materials are largely chlorine and bromine substituted lower alkanes, the molecule may also contain hydroxyl groups. Thus, 2,2,2-tribromoethanol and 2,2,2-trichloroethanol have been used with particular success as halogen free radical generating agents. Similarly, aromatic materials having a chlorine or bromine atom in an alkyl side chain, such as 2-chloroacetophenone, can be used.

Although the exact mechanism by which the halogenated substance acts in the compositions of the present invention is not known with certainty, it is believed that these materials decompose in the presence of suitable actinic radiation to produce halogen free radicals in a self-propagating reaction leading, in part, to the production of halogen acids. These halogen acids in turn neutralize the alkaline bleaches maintaining the phototropic dyes in their leuco form, and speed the conversion of the colorless dyestuffs to their colored form.

Thus, the incorporation of even trace amounts of the halogen-containing substances of the invention will speed up the conversion of the transparent materials of the invention to their colored form. In general, the molar ratio of dyestuff employed to halogen-containing material present in the composition may vary between 1:15 and 15:1. The best compositions within this general range can be readily determined by the average chemist with a view to the intensity of the light source to which the compositions are to be exposed, and the dyestuff and solvent present.

The photosensitive compositions of the invention are prepared by combining the components in the absence of ultraviolet light or visible light of short wavelength sufficient to trigger the compositions. For example, a dye of the type described is dissolved in a solvent therefor to make a solution containing up to about 5% by weight of dye. The dye may initially be employed in its leuco form, or an alkaline bleaching agent of the type described can be added to a colored dye solution until the dye color disappears. If bleach is added in this manner, approximately equimolar amounts of dye and bleach are used. Then, the halogen-containing reagent is added to the composition.

The compositions so obtained may be used per se to show irreversible phototropic reactions, or can be cast in the form of thin layers, or can be used to impregnate absorbent transparent materials. Thus, for example, polyvinyl butyral and a low boiling solvent may be combined with the pellucid photosensitive composition and the resulting film forming composition used to cast films.

Alternatively, a film or other body of resin, such as of polyvinyl butyral, may be contacted with the phototropic solution until the solution has permeated thereinto. Numerous other resinous materials can be used in place of polyvinyl butyral, such as celulose acetate, or cellulose acetate-aryl sulfonamide-formaldehyde resins.

The resulting cast films or impregnated film sheets can be used per se or can be combined in a laminate between other materials transparent to visible light and to visible or ultraviolet light in the activating wavelength range.

Materials such as alkyl polyester films and polyethylene terephthalate films, or glass, have been used to particular advantage as laminating materials.

The laminates can conveniently be used as lenses in optical devices such as eyeglasses. Particularly in this form, the phototropic compositions of the invention are useful as convenient protection against flash blindness from photoflash, lightning, and other high intensity light sources such as welding or other electrical arcs. Particularly good optical devices have been made from laminates of polyvinyl butyral resin impregnated with the compositions of the invention and sheets of "Mylar" polyethylene terephthalate from 1–10 mils in thickness.

In ultraviolet light, the compositions of the present invention will start to convert to substantially opaque materials in a matter of microseconds. By "substantially opaque" materials are meant those having an optical density of 4, relative to the transparent materials: that is, materials showing a reduction in transmission of visible light by a factor of $10^{-4}$. In the relatively weak ultraviolet light of sunlight, the compositions of the invention can become substantially opaque (density—4) in approximately 1 minute. As the intensity of the light source increases, the rapidity of conversion of the compositions to an opaque composition increases.

The composition, or films prepared therefrom, or optical devices employing such compositions and/or films, are storable for a period of months in the dark without substantial change in the original transparency or in sensitivity to ultraviolet.

It is believed that the mechanism of the conversion reaction depends on a fast primary phototropic reaction in which the leuco dye molecule is decomposed with formation of the colored dye material. This is accompanied by a slower secondary actinic decomposition of the halogen reagent in the mixture to form products, the most important of which are probably halogen acids, reactive with the dye substances. One advantage of the compositions is that the new compositions have a quantum efficiency much greater than one.

Reversible phototropic reactions theoretically cannot have a quantum efficiency exceeding one. However, the secondary non-reversible photochemical free-radical reaction involving the halogen reagent can have a much higher quantum yield. Thus, in the compositions of the invention a reversible phototropic reaction and a non-reversible photochemical reaction takes place concurrently. The average quantum efficiency of the overall reaction is greater than one.

A better understanding of the invention and of its many advantages will be had by referring to the following examples, given by way of illustration.

Example 0.45 gm. of 1,5-bis-4(N,N-dimethylamino)phenyl-1,5-bis-(phenyl)divinylcarbonium perchlorate was dissolved in 6 ml. of 2-(2-methoxyethoxy)ethanol at room temperature. The dye was then bleached by the addition of 1.32 ml. of a 1 M solution of potassium hydroxide in 2-(2-methoxyethoxy)ethanol. 4 ml. of bromoform were added to the bleached solution, and the preparation was then stored in the dark. A thoroughly washed and dried piece of polyvinyl butyral resin 24 inches square was soaked in the solution for about 16 hours. The resulting impregnated sheet was then placed between two 32 inch squares of polyethylene terephthalate and laminated with pressure at room temperature. The edges of the flexible laminate were sealed with a gas flame.

The laminate had an initial percent transmission of 80–85% and changed to an optical density of 4 in 1½–2 minutes when irradiated with an ultraviolet source of $4.1 \times 10^{14}$ Q./sec./cm.$^2$ intensity, which is approximately equivalent to sunlight. The laminate will more rapidly change to an optical density of 4 when flashed with an electronic flash source of an intensity of $2.82 \times 10^{18}$ Q./sec./cm.$^2$.

The laminate can also be formed between pieces of polymethyl methacrylate or glass, the edges of the laminate being conveniently sealed with a suitable adhesive.

Example 2

0.9 gm. of the leuco hydroxide of 1,1,5,5-tetrakis (p-dimethylaminophenyl) divinylcarbonium perchlorate was dissolved in 50 ml. of 2-(2-methoxyethoxy)ethanol. 6.3 gm. of hexachloroethane were added to the solution and the preparation stored in the dark. A washed and dried piece of polyvinyl butyral laminating plastic was soaked in the solution for about 10–15 hours, and then placed between two pieces of glass and laminated in a preheated autoclave at 175°–185° F. under 180 p.s.i. pressure for 4–5 minutes.

The laminate so prepared had initial percent transmission of 80–90%, and changes to an optical density of 2 in 1½–2 minutes when irradiated with an ultraviolet source of $4.1 \times 10^{14}$ Q./sec./cm.$^2$. The irradiated laminate is deep blue in color.

Example 3

A composition developing a neutral color on irradiation was prepared by combining 0.1 gm. of the eluco hydroxide of a commercially available red polymethine dye and 0.9 gm. of the leuco hydroxide of 1,1,5,5,-tetrakis(p-dimethylaminophenyl)divinylcarbonium perchlorate in 50 ml. of methoxytriglycol. 3.9 gm. of 2,2,2-trichloroethane were added, and the preparation stored in the dark. The composition was processed to form a laminate as described in Example 2. The initial percent transmission and the amount of change observed in optical density were the same as for the material in Example 2 under comparable conditions.

The commercial red dye can be replaced with corresponding quantities of 1-(1,3,3-trimethyl indoline)-2- 4(N,N-dimethylamino)phenyl vinylcarbonium perchlorate, or salts of N 4(N,N-dimethylamino cinnanylidene auramine,

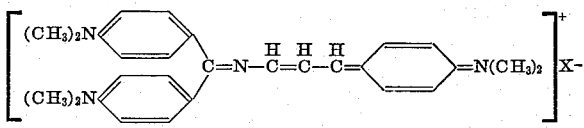

malachite green, crystal violet, or the like.

Although specific embodiments have been shown and described herein, it is to be understood that they are illustrative, and are not to be construed as limiting on the scope and spirit of the invention.

What is claimed is:

1. The method of irreversibly increasing the optical density of a pellucid photosensitive composition consist-essentially of a normally phototropic bis(p-aminophenyl) vinyl carbonium polymethine dye in its leuco form, a halogen-containing substance generating halogen-free radicals on exposure to actinic radiation of a wavelength less than about 500 millimicrons, and a polar hydroxylic solvent for said dye and halogen-containing substance, which process comprises exposing said photosensitive composition to actinic radiation.

2. The method as in claim 1 wherein said composition is in the form of a pellucid film.

3. The method as in claim 2 wherein said pellucid film is supported on a substrate.

References Cited by the Examiner

UNITED STATES PATENTS

| | | | |
|---|---|---|---|
| 1,658,510 | 2/1928 | Beebe et al. | 96—115 X |
| 2,551,133 | 5/1951 | Jennings et al. | 96—27 X |
| 2,700,736 | 1/1955 | Roberts | 252—408 |

(Other references on following page)

UNITED STATES PATENTS

| | | | |
|---|---|---|---|
| 2,789,053 | 4/1957 | Elliott | 96—115 X |
| 2,813,802 | 11/1957 | Ingle | 117—33.3 |
| 2,824,234 | 2/1958 | Schulte et al. | 252—408 |
| 2,992,938 | 7/1961 | McCarville et al. | 88—106 |
| 3,100,703 | 8/1963 | Sprague et al. | 96—90 |
| 3,102,027 | 8/1963 | Sprague et al. | 96—90 |
| 3,104,176 | 9/1963 | Hovey. | |
| 3,106,466 | 10/1963 | Sprague et al. | 96—90 |
| 3,121,012 | 2/1964 | Arguss | 88—106 |

FOREIGN PATENTS

| | | |
|---|---|---|
| 349,060 | 3/1905 | France. |
| 521,268 | 3/1955 | Italy. |

OTHER REFERENCES

Culver et al., "Visual Problems in Aviation Medicine," Pergamon Press, Oxford, A62, pages 34–38 relied on.

Fox, "Development of Photoreactive Material for Eye Protective Devices;" Report AD–261608, April 1961 (National Cash Register); Report AD–261608, April 1961, Abstract in Nuclear Science Abstracts, No. 11, vol. 16, June 15, 1962 (Abst. No. 13390).

Sprague et al., "Photographic Science and Engineering," vol. 5, No. 2, March–April 1961, pages 98–103.

NORMAN G. TORCHIN, *Primary Examiner.*

R. L. STONE, A. LIBERMAN, D. PRICE,
*Assistant Examiners.*